US006264106B1

United States Patent
Bridgelall

(10) Patent No.: US 6,264,106 B1
(45) Date of Patent: Jul. 24, 2001

(54) COMBINATION BAR CODE SCANNER/RFID CIRCUIT

(75) Inventor: Raj Bridgelall, Ronkonkoma, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/472,565

(22) Filed: Dec. 27, 1999

(51) Int. Cl.[7] .................................................. G06K 7/10
(52) U.S. Cl. .............................. 235/462.46; 235/472.02
(58) Field of Search .......................... 235/462.46, 472.02

(56) References Cited

U.S. PATENT DOCUMENTS 5,382,784 * 1/1995 Eberhardt ..................... 235/472.01
5,563,402 * 10/1996 Redderson et al. ................ 235/436
5,763,867 * 6/1998 Main et al. ..................... 235/472.01
5,811,782 * 9/1998 Sato et al. ..................... 235/462.01

* cited by examiner

Primary Examiner—Harold I. Pitts

(57) ABSTRACT

A circuit that combines the functionality of a bar code scanner and an RFID circuit is provided. This circuit uses certain functional blocks for processing both the bar code signals and the RFID signals. As a result, the space and power consumed by the circuit are substantially reduced such that the circuit can be formed to fit a free-standing, hand-held reader device. The circuit also may use a single interface from a hand-held device to central processing unit to process digital signals from both the bar code scanner and the RFID circuit. In addition, in one embodiment, the circuit may also simultaneously process bar code signals and RFID signals.

27 Claims, 4 Drawing Sheets

COMBINATION BAR CODE SCANNER/RFID CIRCUIT

BACKGROUND OF THE INVENTION

This invention relates to bar code scanning circuits and RFID (Radio Frequency Identification) circuits. More specifically, this invention relates to providing increased functionality of circuitry in standard forms of these circuits.

In the Automatic Identification and Data Capture (AIDC) industry, certain form factors, i.e., specific space allocation for devices having a known functionality, have become standard. One example of a form factor in the AIDC industry is the conventional hand-held, pistol-shaped housing for bar code scanners. Another example of a form factor is the module-size of a commonly used laser scan engine—e.g., the SE1200 scan engine produced by the assignee, Symbol Technologies, Inc. of Holtsville, N.Y.—which has established a standard form factor for laser bar code scanner circuitry modules in the AIDC industry.

However, because the form factors are standard, and, therefore, the space allocated for the device is limited to a certain size and shape, the functionality of the device is limited as well. In addition, the interfaces to and from the standard form factors are generally fixed—e.g., a certain form factor will be limited to an eight-pin interface.

Therefore, it would be desirable to provide a device which fits an accepted form factor and interface, yet adds increased functionality.

It would also be desirable to provide a device that adds increased functionality, fits in an accepted form factor and which utilizes circuitry already present within the device to support the added functionality.

SUMMARY OF THE INVENTION

It is an object of this invention to provide a device which fits an accepted form factor and interface, yet adds increased functionality.

It is also an object of this invention to provide a device that adds increased functionality, fits in an accepted form factor and which utilizes circuitry already present within the device to support the added functionality.

A bar code scanner/RFID circuit for use in a free-standing reader device and that provides an interrogation signal to an identification tag (e.g., either a bar code tag or an RF tag, or a combination of both), and receiving a data signal from an identification tag, is provided. The circuit can preferably be formed to fit accepted sizes for a laser scan engine available in the industry. The circuit includes a first processing unit, a bar code scanner circuit, an RFID circuit, a second processing circuit and a data acquisition circuit.

The second processing circuit is coupled to receive a data acquisition command from the first processing unit, and, in response to the data acquisition command, to instruct either the bar code scanner circuit or the RFID circuit, or both, to provide an interrogation signal to the identification tag and to receive the data signal.

The data acquisition circuit is adapted to receive the data signal from either the bar code scanner circuit or the RFID circuit, to process the data signal first into an analog signal (although the data signal is already analog, it is not suitable for digitization without additional processing) and then into a digital signal, and to transmit the digital signal to the central processing unit over a digital signal path.

In one embodiment of the invention, the bar code scanner/RFID circuit may accept a data signal from each of the bar code scanner circuit and the RFID circuit simultaneously.

BRIEF SUMMARY OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
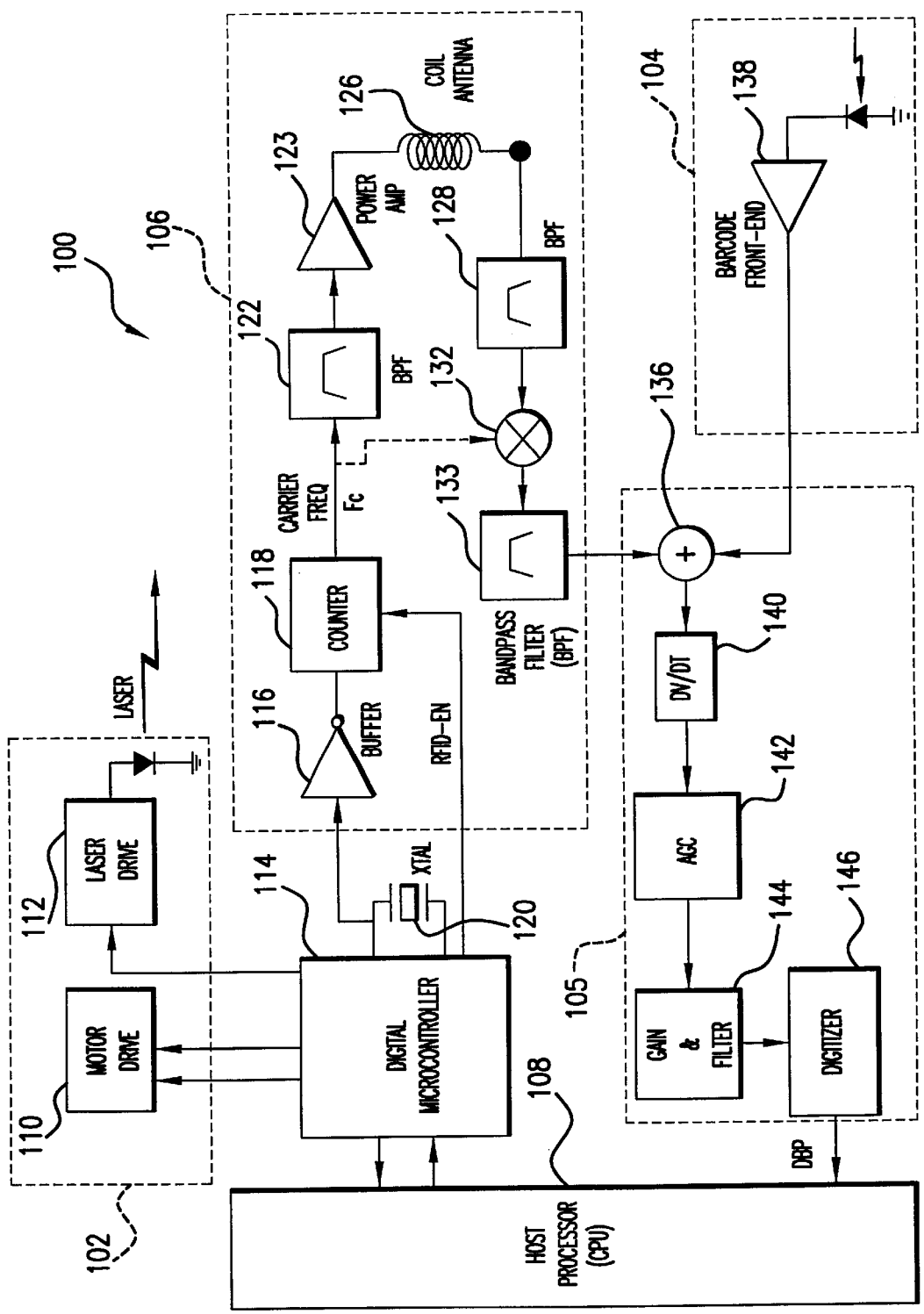
FIG. 1 is a block diagram of a first preferred embodiment of a bar code scanner/RFID circuit according to the invention.

A circuit for use in a free-standing device that combines certain functional elements of a bar code scanner circuit and an RFID circuit is provided.

The method and/or circuitry required to produce outgoing bar code interrogation signals and to produce outgoing RFID interrogation signals share certain similarities. In addition, the method and/or circuitry required to process incoming data signals from either a bar code tag or an RFID tag, respectively, share certain similarities. The similarities are as follows.

First, each command to generate an outgoing bar code interrogation signal or an outgoing RFID interrogation signal may be provided by a suitable processing unit—e.g., preferably a digital microcontroller. While it is true that the commands received by the bar code circuit and the RFID circuit may vary in frequency or other signal characteristic, nevertheless, one processing unit is capable of commanding either circuit at various frequencies or characteristics. Therefore, it is highly advantageous to utilize one microcontroller to provide each of the bar code circuit and the RFID circuit with the command to generate interrogation signals. This saves space and power as compared to a design which utilizes two microcontrollers to provide the command to generate interrogation signals.

Another similarity between the two circuits is that each of the bar code scanner circuit and the RFID circuit receive and pre-process data signals which they receive from a bar code tag or an RF tag, respectively. Then, each of the circuits provides a pre-processed signal to a data acquisition circuit. The data acquisition circuit preferably includes a summing circuit or a multiplexer for receiving the data signal, a peak detector (or comparator, or other suitable circuit for determining the length and/or magnitude of the peaks of the incoming data signal), filter components, gain components and suitable circuitry for converting the data signal into an acceptable analog signal and then into a digital signal—e.g., a digitizer or similar analog-to-digital converter. The digital signal can then be transmitted to the central processing unit.

Following pre-processing, the respective data signals from each of the bar code circuit and the RFID circuit are substantially similar. Therefore, further processing of the data signals into digitizable analog signals, and their respective conversion from analog to digital signals, can be accomplished with a single data acquisition circuit. By utilizing a single data acquisition circuit to process the data signal produced by each of the bar code circuit and the RFID circuit, a significant reduction in circuit size and power consumption can be realized.

As mentioned above, the data acquisition circuit may preferably include a summing circuit or a multiplexer, a peak detector (or other suitable circuit—e.g., a comparator) for detecting the magnitude, frequency and duration of the peak of the data signal, filter components, gain components, and suitable circuitry for converting the analog signal into a digital signal—e.g., a digitizer or other analog to digital converter. In addition, a single interface can be used to interface between the bar code scan/RFID circuitry (which is preferably located in a hand-held reader or scanning device), specifically between the data acquisition circuit and the central processing unit, as opposed to two individual interfaces. A preferable embodiment of this interface is an eight-pin interface between the central processing unit and the bar code scan/RFID circuitry. The eight pins are preferably reserved for the following eight functions: 1)power, 2)Automatic Gain Control, 3)laser enable 4)scan enable, 5)SOS—Start Of Scan, 6)DBP—Digital Bar Pattern, 7)digital ground and 8) analog ground. This configuration provides for a single digital signal path to the central processing unit for both the bar code scanner and the RFID circuit while using a single eight-pin interface. The RFID is enable via a command from the central processing unit to the microcontroller or one of the eight unique possible combinations of 2)AGC 3)Laser Enable) or 4) Scan Enable to be decoded and interpreted by the microcontroller. One of these pins can also be used to "wake up" the microcontroller from sleep mode, if desired.

FIG. 1 shows a block diagram of one preferable embodiment of a bar code scanner/RFID circuit 100 according to the principles of the invention.

When a user instructs central processing unit 108 to read an identification tag (e.g., a bar code tag, an RF tag or both), central processing unit 108 provides a data acquisition command to digital microprocessor 114 (or some other suitable processing unit. In one embodiment of the invention, all the tasks performed by central processing unit 108 and digital microprocessor 114 can be performed by a single processing unit). The data acquisition command could be either to read the tag as a bar code tag or to read it as an RF tag. The data acquisition command could also be to read the tag as both a bar code tag and an RF tag as will be discussed below (in the embodiment where both are read, an actuator on a hand-held device containing the present invention should preferably be provided such that the positions available to the user are bar code scan, RFID scan and simultaneous bar code/RFID setting).

The bar code scanner circuit includes laser propagation device 102 and laser detection device 104, shown in dashed lines in FIG. 1. If the data acquisition command instructs microprocessor 114 to read the tag as a bar code, microprocessor 114 then turns ON laser 112 which generates a laser beam. Microprocessor 114 also turns ON motor drive 110 which actuates a laser scan pattern for laser 112, or of a mirror (not shown) which reflects the emitted laser beam, such that multiple laser beams, which preferably cover the entire breadth of a bar code, can be generated by a single laser device, giving the appearance of multiple lasers. Laser 112 may preferably incorporate a VCSEL (Vertical Cavity Surface-Emitting Laser) or some other suitable device for generating a light beam. These laser devices are well known in the art. Other image projection and capture devices are also possible, as will be described in detail.

After the data signal—i.e., the reflected laser light—is detected by laser detection circuit 104, the signal is pre-processed by front end 138. This may preferably be a pre-amplifier to amplify the data signal and transmit it to data acquisition circuit 105.

Microcontroller 114 is also configured to provide a command signal to RFID circuit 106. Crystal 120 provides a clock signal to microcontroller 114 and to amplifier 112. Amplifier 112 amplifies and processes the clock signal from crystal 120 and provides a signal to counter 118.

Microcontroller 114 also provides an RFID enable signal to counter 118 which enables the RFID circuit. Thereafter, the counter signal is preferably filtered by bandpass filter 112, amplified by power amplifier 123 and then propagated as an RF signal via antenna 126. Antenna 126 then determines, either through inductive coupling, through RF propagation, or other suitable RF method, whether there is an RFID tag in the RF field propagated by antenna 126, and, if so, the characteristics of the RFID tag.

Thereafter, antenna 126 transmits a data signal based on the RF information to a bandpass filter 128. Bandpass filter then transmits the signal to multiplier 132, which samples the signal at a rate preferably controlled by counter 118 and then transmits the sampled signal to another bandpass filter 133 which further pre-processes the data signal and transmits it to data acquisition circuit 105. The particular electronics for pre-processing the data signal are well-known in the art and are not limited to the particular embodiment shown in FIG. 1.

Following pre-processing, each of the data signals from laser detection circuit 104 and from RFID circuit 106 are similar enough such that a single component—e.g., element 136—can be utilized as a receiver for both signals. Element 136 can preferably be a summing circuit, which adds both signals and thereby utilizes only the signal being received, a multiplexer or other suitable device.

Thereafter, the signal is preferably transmitted to element 140 in data acquisition circuit 105. Element 140 can preferably be a peak detector, comparator, differentiator or other suitable device for determining the magnitude and duration of the peaks of the incoming signal.

The signal preferably is then further processed by the automatic gain control 142, the gain and filter block 144, and the digitizer 146, after which it preferably is transmitted as a suitable digital signal to central processing unit 108. The signal may be transmitted to central processing unit 108 by a single eight-pin interface, as described above, or other suitable single interface for transmitting digital signals.

Thus, by utilizing a single microcontroller, a single data acquisition circuit and a single interface and digital signal path, a bar code scanner/RFID circuit can be substantially reduced in size. At this reduced size, the circuit can be formed to fit into space which is currently allocated for modules that provide only scanning capabilities—e.g., a space created to contain the aforementioned SE1200 scan engine.

In an alternative embodiment of the invention, a bar code scanner/RFID circuit can be modified to simultaneously scan a bar code tag and an RFID tag. This may prove useful, for example, if one of the identifiers, either the bar code tag or the RFID tags, was rendered unreadable by some obstruction or other interruption. A circuit that scans and reads simultaneously from both types of identifiers preferably would provide a redundancy whereby any interruption in either system would be overcome by the second system (except where both systems were obstructed). In addition, such a redundancy could provide for an added security measure by cross-confirming the results from each individual identification with the other identification. Another possible advantage of having simultaneous readings is the following: in one embodiment of a circuit according to the invention, a bar code could provide a key to decrypt the RFID whereby the RFID could only be deciphered with an encryption key found in the bar code, or vice versa.

In an another alternative embodiment, a digitizer used previously only for bar codes may be used according to the invention. Moreover, there is an added benefit that is obtained by using a bar code digitizer to process the analog signal from the RFID circuit. The bar code digitizer provides greater read range performance for the RFID than conventional analog to digital conversion allows.

Bar code digitizers are specially designed to handle highly blurred bar code signals. The data can be recovered by the bar code digitizer even though the filtering process, which results from the larger laser beam spot, effectively reduces the bandwidth of the "channel" of the recovered information. By using a bar code digitizer for RFID, the bandwidth is artificially reduced. However, this reduction of bandwidth, which blurs the incoming signal and causes it to appear more blurry, increases the interrogation range. The bar code digitizer is capable of handling this higher "blur" or lower contrast signal and will effectively compensate for the artificial channel bandwidth reduction. Thus, using a bar code digitizer to convert RFID signals increases the interrogation of the RFID. Reducing the bandwidth of the RFID antenna increases the Q, and, thereby, the energy coupled to the RFID tag. It also reduces the noise on the RFID receiver, which, in turn, improves its sensitivity to detect weak RFID tag signals. Weak RFID tag signals may be due to long range or a material blockage—e.g., metal or water, or a wet cardboard container.

Figure 1A:
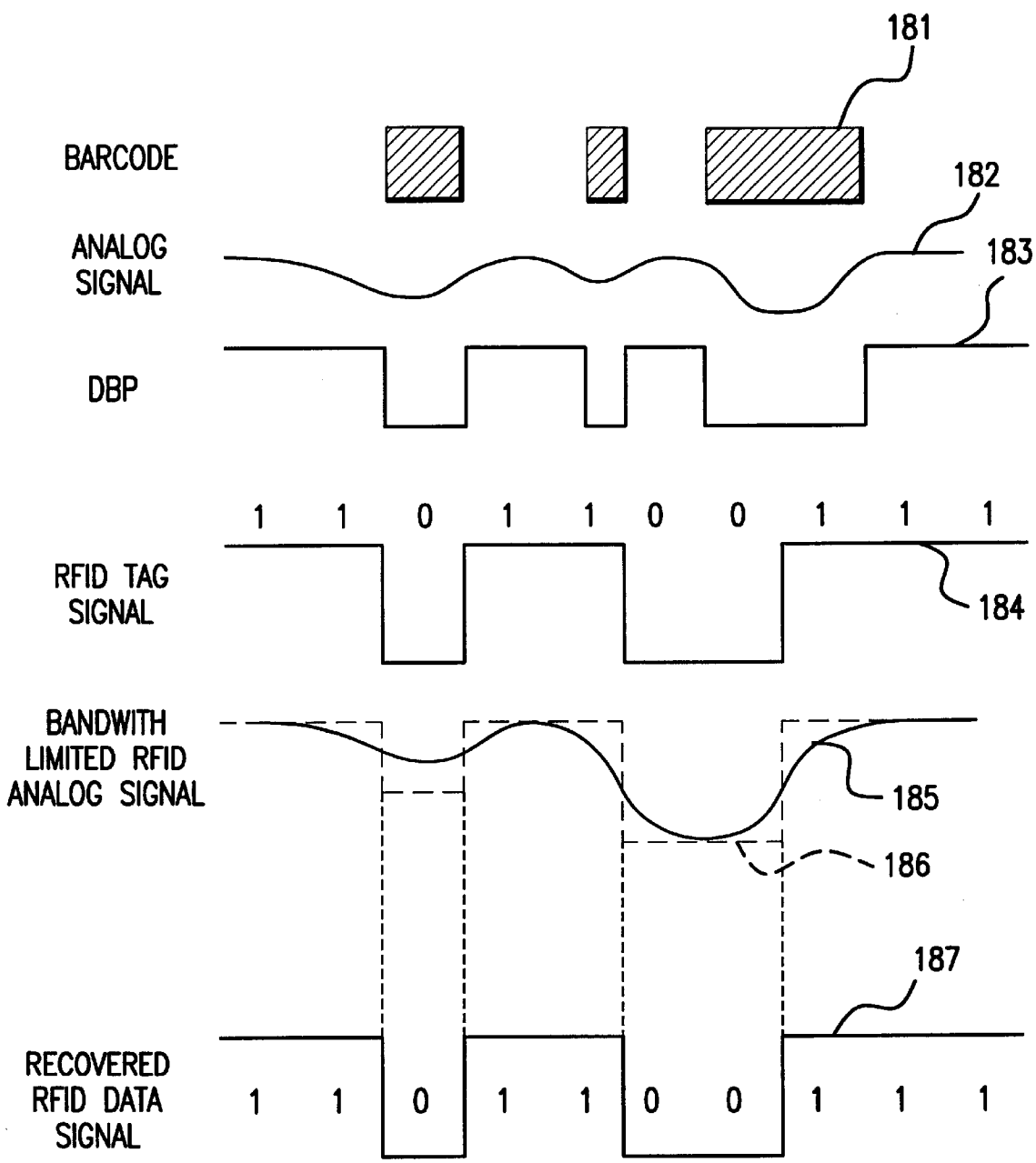
FIG. 1A is a diagram of exemplary signals processed by the data acquisition circuits of bar code readers and RFID circuits.

FIG. 1A shows a typical example of possible signals from bar code circuits and RFID circuits. Code 181 is an exemplary bar code. Analog signal 182 is an exemplary analog bar code signal. The lack of clarity, or blur, is evident in signal 182. Digital signal 183 is shown after a bar code digitizer removes the blur. RFID signal 184 is an example of a signal sent by an RFID tag. The blurred signal 185 is an example of the RFID signal as received by a reduced bandwidth receiver. Dotted line 186 indicates the signal received by RFID antenna with sufficiently wide bandwidth. Signal 187 is a digital RFID signal after processing by a bar code digitizer. Signal 187 is substantially the equivalent of dotted line 186, but processing signals in the fashion that signal 186 is processed increases the interrogation range of the RFID system.

Figure 2:
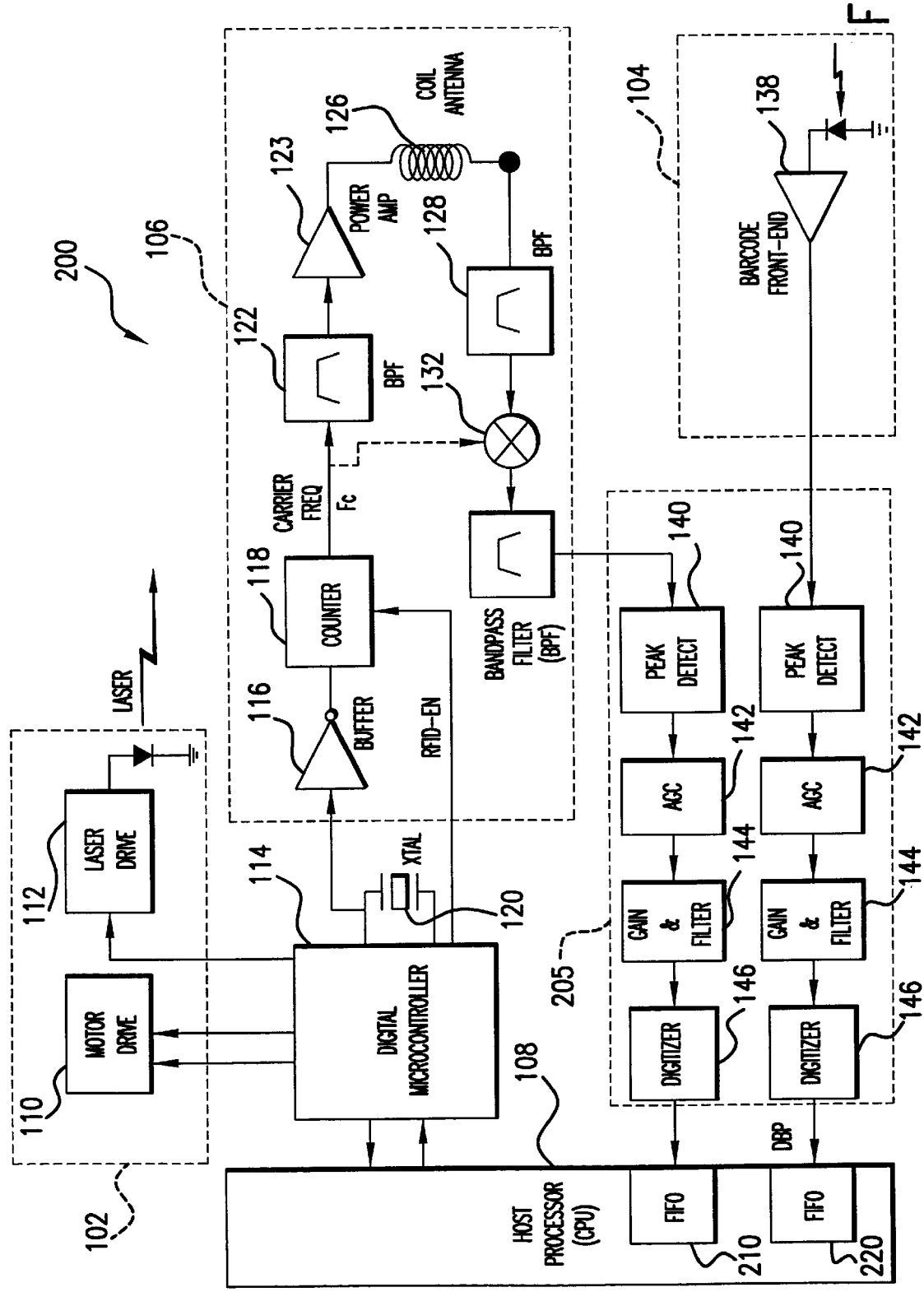
FIG. 2 is a block diagram of a second embodiment of a bar code scanner/RFID circuit according to the invention.

FIG. 2 shows a block diagram of one embodiment of a simultaneous bar code scanner/RFID circuit 200 according to the principles of the invention that is capable of simultaneously processing a bar code signal and an RFID signal. The main difference between this circuit and bar code scanner/RFID circuit 100 is found in the data acquisition path.

Data acquisition circuit 205 preferably includes two separate data transfer paths. Each path preferably includes peak detector 140, automatic gain control 142, gain and filter block 144, and digitizer 146. This particular embodiment eliminates the need for element 136 because the data signals from each of bar code scanner circuit 104 and RFID circuit 106 are transmitted directly to peak detector 140.

One problem with this approach is that the digital signals produced by each of bar code scanner circuit 104 and RFID circuit 106 may arrive at central processing unit 108 substantially simultaneously. This could create a situation where the incoming signal must be sorted by central processing unit 108 before it can be deciphered. In one embodiment, this problem can be overcome with additional configuration of the central processing unit to receive two signals simultaneously through a single data acquisition circuit 105 (as is shown in FIG. 1).

One preferable way to perform this step is by using first-in, first-out buffers (FIFO) 210 and 220. These buffers take the first signal received from either bar code scanner circuit 104 or RFID circuit 106 and use it for identification, while placing signals from the other circuit in a buffer. The second signal received can then be used for verification. Or, in another embodiment, the first signal can be used for providing an encryption key and then, with the key, the second signal can be decrypted and used for identification.

Figure 3:
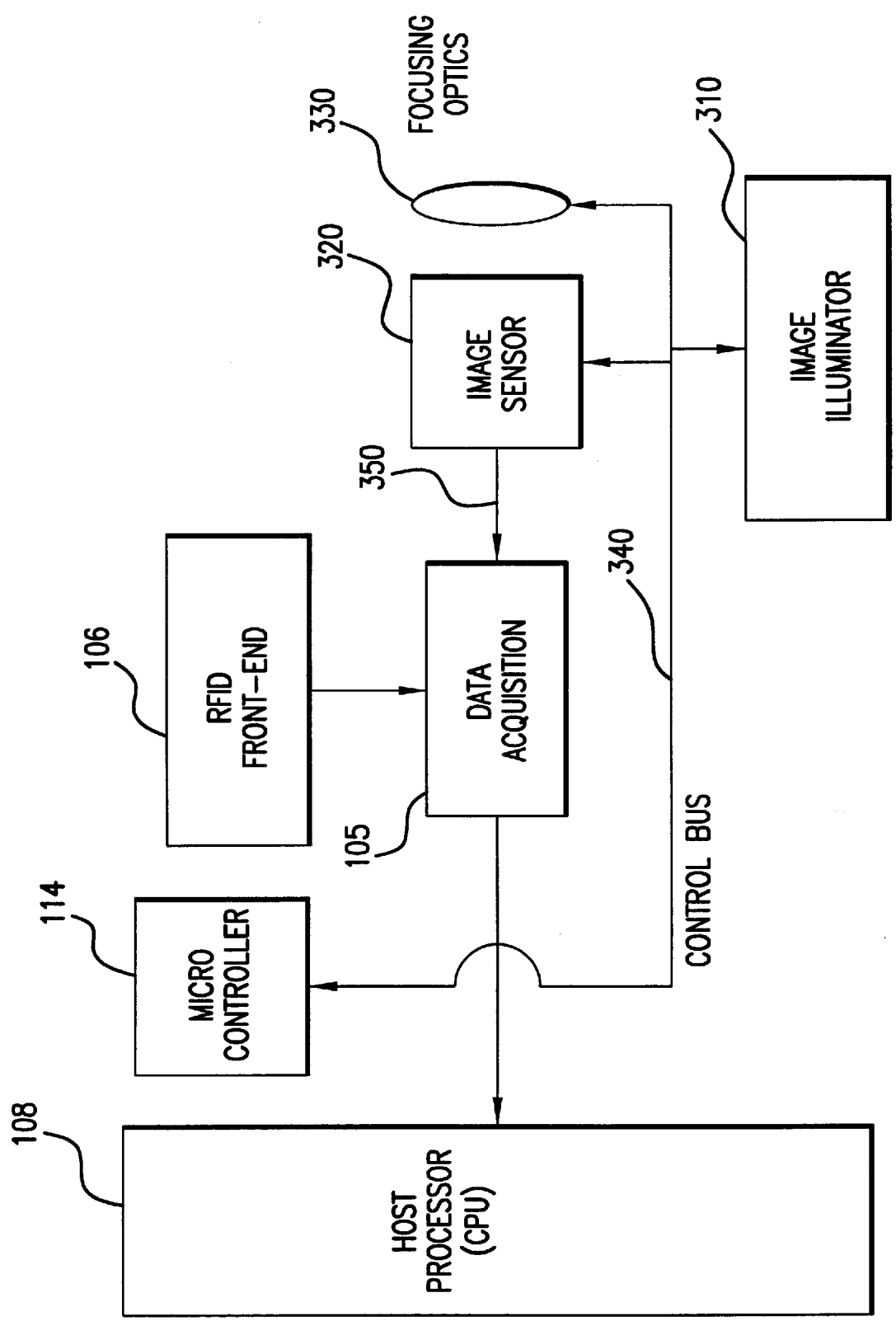
FIG. 3 is a block diagram of another embodiment of a image capture/RFID circuit.

In an alternative embodiment, charge-coupled devices (CCD) or CMOS sensor-based devices can be substituted for the bar code data acquisition portion. FIG. 3 shows one possible configuration of image capture circuitry to be substituted for the laser-only bar code reading device. Image illuminator 310 can be used to project the interrogation beam. Image sensor 320 can be used to receive the reflected beam via focusing optics 330 and transmit an analog pixel signal 350 to data acquisition circuit 105 because address sensor pixel signal 350 is similar to a bar code analog signal. The operation of the image capture circuitry can be controlled by microcontroller 114 via control bus 340.

Thus, it is seen that a bar code scanner/RFID circuit that fits an accepted form factor—e.g., a standard free-standing reader device, adds increased functionality, and that utilizes circuitry already present within the device to support the added functionality has been provided. In one embodiment of the invention, this circuit is capable of simultaneous bar code and RFID identification. In other embodiments, it would be useful if in lieu of the bar code sensor front-ends, other analog or digital output sensors were deployed. Examples of such sensors include magstripe reader, temperature monitor, biometric reader and temperature sensor. For example, a multi-functional engine could be used that can simultaneously read the RFID badge, as well as a fingerprint signal for authentication. Also, an RFID reader could take a sample of the environmental temperature at the time the product was received (e.g., for perishable goods).

In a further embodiment, the first processing unit and second processing unit can be combined into a single processing unit.

Persons skilled in the art will appreciate that the present invention can be practiced by other than the described embodiments, which are presented for purposes of illustration rather than of limitation, and the present invention is limited only by the claims which follow.

What is claimed is:

1. A bar code scanner/RFID circuit for use in a free-standing reader device, and that provides an interrogation signal to an identification tag, receives a data signal from an identification tag, and that provides a digital signal to a processing unit, the circuit comprising:

a bar code scanner circuit;

an RFID circuit;

wherein the processing unit is coupled to receive a data acquisition command, and, in response to the data acquisition command, to instruct at least one of the bar code scanner circuit and the RFID circuit to provide the interrogation signal, to receive the data signal, and to transmit the data signal; and a data acquisition circuit which is adapted to receive the data signal from at least one of the bar code scanner circuit and the RFID circuit, to process the data signal into an analog signal and then into the digital signal, and to transmit the digital signal to the processing unit.

2. The bar code scanner/RFID circuit of claim 1, wherein the data acquisition circuit comprises a summing circuit.

3. The bar code scanner/RFID circuit of claim 1, wherein the data acquisition circuit comprises a multiplexer.

4. The bar code scanner/RFID circuit of claim 1, wherein the data acquisition circuit comprises a gain control and filter circuit for processing the data signal into the analog signal that is suitable for digitization.

5. The bar code scanner/RFID circuit of claim 1, wherein the data acquisition circuit comprises a digitizer.

6. The bar code scanner/RFID circuit of claim 1, wherein the data acquisition circuit comprises a comparator.

7. The bar code scanner/RFID circuit of claim 1, wherein the data acquisition circuit comprises a differentiator.

8. The bar code scanner/RFID circuit of claim 1, wherein the data acquisition circuit comprises a peak detector.

9. The bar code scanner/RFID circuit of claim 1, wherein the data acquisition circuit is further adapted to receive the data signals from both the bar code scanner circuit and the RFID circuit simultaneously, to process the data signals into analog signals and then into digital signals, and to transmit each digital signal to the first processing unit.

10. The bar code scanner/RFID circuit of claim 1, wherein the bar code scanner/RFID circuit fits into a modular space provided for an SE1200 scan engine.

11. The bar code scanner/RFID circuit of claim 1, wherein the bar code scanner/RFID circuit is resident in a hand-held reader device.

12. The bar code scanner/RFID circuit of claim 1, wherein the data acquisition circuit transmits the digital signal to the processing unit with an eight pin interface.

13. The bar code scanner/RFID circuit of claim 1, wherein a scanning field emitted by a bar code scanner portion of the bar code scanner/RFID circuit is substantially equivalent in directional orientation to an RF field emitted by an RFID portion of the bar code scanner/RFID circuit.

14. The bar code scanner/RFID circuit of claim 1, wherein the data acquisition circuit is adapted to simultaneously produce digital signals in response to the data signals produced by both the bar code scanner circuit and by the RFID circuit.

15. The bar code scanner/RFID circuit of claim 1, wherein multiple processing units are utilized.

16. A method of reading a bar code and an RFID tag using a hand-held reading device, comprising:

providing at least one of a bar code interrogation signal and an RFID interrogation signal to at least one identification tag;

receiving at least one data signal from the at least one identification tag in response to the at least one bar code interrogation signal and the RFID interrogation signal;

transforming the at least one data signal into an analog signal;

digitizing the analog signal within the reading device into a digital signal; and transmitting the digital signal to a central processing unit.

17. The method of claim 16 wherein the providing comprises simultaneously providing a bar code interrogation signal and an RFID interrogation signal to at least one identification tag.

18. The method of claim 16 wherein the transmitting comprising transmitting through an eight pin interface.

19. The method of claim 16 wherein the transmitting comprises substantially simultaneously transmitting a digital signal which results in a response to a bar code interrogation signal and transmitting a digital signal which results in response to an RFID interrogation signal.

20. A bar code scanner/RFID circuit for mounting in a hand-held reading device, said circuit comprising:

means for providing at least one of a bar code interrogation signal and an RFID interrogation signal to at least one identification tag;

means receiving at least one data signal from the at least one identification tag in response to the at least one bar code interrogation signal and the RFID interrogation signal;

means for transforming the at least one data signal into an analog signal;

means for digitizing the analog signal within the reading device into a digital signal; and means for transmitting the digital signal to a central processing unit.

21. The circuit of claim 20 wherein the means for providing comprises simultaneously a means for providing a bar code interrogation signal and an RFID interrogation signal to at least one identification tag.

22. The method of claim 20 wherein the means for transmitting comprising means for transmitting through an eight pin interface.

23. The method of claim 20 wherein the means for transmitting comprises a means for transmitting substantially simultaneously a digital signal in response to a bar code interrogation signal and a digital signal in response to an RFID interrogation signal.

24. An image capture/RFID circuit for use in a freestanding reader device, and that provides an interrogation signal to an identification tag, receives a data signal from an identification tag, and that provides a digital signal to a processing unit, the circuit comprising:

an image capture circuit;

an RFID circuit;

wherein the processing unit is coupled to receive a data acquisition command, and, in response to the data acquisition command, to instruct at least one of the image capture circuit and the RFID circuit to provide the interrogation signal, to receive the data signal, and to transmit the data signal; and a data acquisition circuit which is adapted to receive the data signal from at least one of the image capture circuit and the RFID circuit, to process the data signal into an analog signal and then into the digital signal, and to transmit the digital signal to the processing unit.

25. The image capture/RFID circuit of claim 23, wherein the image capture/RFID circuit is resident in a hand-held reader device.

26. The image capture/RFID circuit of claim 24, wherein the data acquisition circuit transmits the digital signal to the processing unit with an eight pin interface.

27. The image capture/RFID circuit of claim 24, wherein a scanning field emitted by a image capture portion of the image capture/RFID circuit is substantially equivalent in directional orientation to an RF field emitted by an RFID portion of the image capture/RFID circuit.

* * * * *